US012372013B2

(12) United States Patent
Gavriluk

(10) Patent No.: US 12,372,013 B2
(45) Date of Patent: Jul. 29, 2025

(54) INTERNAL COMBUSTION ENGINE WITH A HIGH-PRESSURE FUEL PUMP

(71) Applicant: Yuri Gavriluk, Brooklyn, NY (US)

(72) Inventor: Yuri Gavriluk, Brooklyn, NY (US)

( * ) Notice: Subject to any disclaimer, the term of this patent is extended or adjusted under 35 U.S.C. 154(b) by 0 days.

(21) Appl. No.: 18/734,048

(22) Filed: Jun. 5, 2024

(65) Prior Publication Data

US 2024/0401505 A1 Dec. 5, 2024

Related U.S. Application Data

(63) Continuation of application No. 16/728,316, filed on Dec. 27, 2019, now Pat. No. 12,031,458.

(51) Int. Cl.

| | |
|---|---|
| ***F01L 1/10*** | (2006.01) |
| ***F02B 3/02*** | (2006.01) |
| ***F02B 75/18*** | (2006.01) |
| ***F02D 41/38*** | (2006.01) |
| ***F02F 7/00*** | (2006.01) |
| ***F02M 63/02*** | (2006.01) |

(52) U.S. Cl.

CPC *F01L 1/10* (2013.01); *F02B 3/02* (2013.01); *F02B 75/18* (2013.01); *F02D 41/38* (2013.01); *F02F 7/0002* (2013.01); *F02M 63/0225* (2013.01)

(58) Field of Classification Search

CPC ..... F01L 1/10; F02B 3/02; F02B 75/18; F02F 7/0002; F02M 39/00; F02M 63/0225; F02D 41/38

See application file for complete search history.

(56) References Cited

U.S. PATENT DOCUMENTS

| | | | | |
|---|---|---|---|---|
| 2009/0025686 A1* | 1/2009 | Kato | F02M 63/0265 123/456 |
| 2014/0121943 A1* | 5/2014 | Lee | F02D 41/3854 701/103 |
| 2017/0342935 A1* | 11/2017 | Arihara | F02M 63/0017 |
| 2019/0195164 A1* | 6/2019 | Hirata | F02M 63/0235 |
| 2021/0033038 A1* | 2/2021 | Hitomi | F02D 41/1454 |

FOREIGN PATENT DOCUMENTS

| | | |
|---|---|---|
| DE | 0543301 A1 * | 5/1993 |
| WO | WO 0663551 A1 * | 10/2001 |

* cited by examiner

*Primary Examiner* — Syed O Hasan

(74) *Attorney, Agent, or Firm* — Thomas A. O'Rourke; James Bongiorno; O'ROURKE IP LAW PLLC

(57) ABSTRACT

A fuel pump includes: a housing with fuel reservoir; first and second axles; respective pluralities of cams fixedly secured to each axle. The first axle and cams are rotated by gas pedal actuation, and meshed gears cause co-rotation of the second axle and its cams. A plurality of housing conduits each have first conduit portions in fluid communication with the fuel reservoir, which transition into second conduit portions in fluid communication with a fuel injector. Pusher rods slidable in each second conduit portion contact spring-biased balls. The gears, cams, and pusher rods ends are positioned in the fuel reservoir. Spring-biased balls also normally block the first conduits. Rotation of the first axle for increased crankshaft rotation speed causes simultaneous rotation of every cam, and each increment of cam rotation into second, third, fourth, and fifth rotational positions sequentially drives a respective pusher rod to provide incremental increased fuel flow.

6 Claims, 17 Drawing Sheets

INTERNAL COMBUSTION ENGINE WITH A HIGH-PRESSURE FUEL PUMP

FIELD OF INVENTION

This invention was not made pursuant to any federally-sponsored research and/or Development.

The present invention relates generally to internal combustion engines. More particularly, the invention relates to an improved internal combustion engine that may be run on any known fuel type, including gasoline, diesel, or gas. The improved internal combustion engine may also be operated with a high-pressure fuel pump and injector of the present invention, which makes it more efficient.

BACKGROUND

The present invention relates to an internal combustion engine. Internal combustion engines operate in various vehicles and tools, including automobiles, airplanes, and various machinery. However, since the appearance of the internal combustion engines, a major problem has been the gas emissions of the engine. Nearly an estimated 150 million, almost half of all Americans-live in areas that don't meet federal air quality standards. Passenger vehicles and heavy-duty trucks are a major source of this pollution, which includes ozone, particulate matter, and other smog-forming emissions. The health risks of air pollution are extremely serious. Poor air quality increases respiratory ailments like asthma and bronchitis, heightens the risk of life-threatening conditions like cancer, and burdens our health care system with substantial medical costs. Despite EPA's Tier 3 Standards passenger vehicles are a major pollution contributor, producing significant amounts of nitrogen oxides, carbon monoxide, and other pollution. In 2013, transportation contributed more than half of the carbon monoxide and nitrogen oxides, and almost a quarter of the hydrocarbons emitted into our air.

Currently, many variations of internal combustion engines exist because the technology is over 100 years old. Even recently, it was ordinary to have the engine efficiency of 20-30%, with the remaining energy of the internal combustion being dissipated into heat. It is therefore an objective of the present invention to provide a more efficient internal combustion engine that can operate using multiple fuel types with some adjustments to the design, For example to be used with the diesel type of fuel some engine parts will need to be reinforced. However, these internal combustion engines are highly inefficient because most of the energy is dissipated into heat and friction. Needless to say, this creates a huge waste of energy and pollution that can be further reduced. The scale of these problems cannot be overestimated. In existing engines there are few known drawbacks such as:

1) cessation, suppression of the air-fuel mass combustion process in a cylinder.
2) premature crankshaft braking before expansion. There are known cases when at unsuccessful start of the engine the rubbing crankshaft stopped and was pushed it in the opposite direction.
3) overpressure of the expanding energy on the crankshaft at the moment when the connecting rods have not yet created a lever and cannot take this energy for good In view of the foregoing, there is a need for improved internal combustion engines that are less complicated in design, more efficient, and reduce the harmful emissions and air pollution.

In the engines that currently produced, there is a paradoxical tightening of the piston with the initial stage of expanding combustion gas mass in the working cylinder from the time of the combustion of the mixture of fuel and air. In the absence of this expansion, this combustible mass gives off its energy to the walls which surround it, without the benefit, instead of converting this energy into the movement of the piston.

What is needed is a highly efficient engine that resolves this inefficient paradox and voids or in some cases drastically minimizes all types of emissions.

SUMMARY OF INVENTION

This invention meets the need for an improved internal combustion engine by providing a new piston internal combustion engine that can be used for vehicles of any size, cars, motorcycles, and equipment or machinery, which performs useful work. This engine is capable of maximizing the efficiency of the combustible material injected into the cylinder by injector of a high-pressure fuel pump ("HPFP"), reducing harmful emissions. At the same time, the novel improved internal combustion engine is easy to operate, inexpensive to manufacture, and it EHHO addresses the issues present in the internal combustion engines known in the art. The novel internal combustion engine achieves that by resolving the existing ineffectiveness in the engines that are available.

In the novel engine disclosed in the present application improvement futures such as 1. the correct movement of force is observed by reason of that from the very beginning of the expansion of the combustible mixture in the working cylinder is already moving in the direction of the desired and very effective expansion.
2. first burning with an ever increasing space/area range of the cylinder, second space overclocking of crankshaft with timely start of expansion.
3, expansion energy begins when the crankshaft and connecting rod form a lever and the energy is completely transferred on to crankshaft rotation speed and torque.

The novel engine of the present invention is capable of maximizing the efficiency of the combustible material injected into the cylinder, set off by the injector of a high-pressure fuel pump. A unique operation process allows to get compressed air utilizing additional cylinder into a working cylinder which increases pressure, after the working piston moves away from its top line of performance, as defined herein.

The structure of the engine has a highly effective alternation of the distribution of functions between the pistons and their cycles. The engine valves never collide with the pistons, and this gives the engine a great deal of reliability, including in adverse weather conditions, having potential use for commercial, industrial and military applications. The movement of the valves does not interfere with the movement of the pistons, and the movement of the pistons does not interfere with the movement of the valves.

BRIEF DESCRIPTION OF THE DRAWINGS

The present invention is illustrated by way of examples, in the figures of the accompanying drawings in which reference numerals refer to elements. The features, aspects and advantages of the novel invention will become further understood with reference to the following description and accompanying drawings where.

DESCRIPTION OF THE PREFERRED EMBODIMENTS

Figure 1:
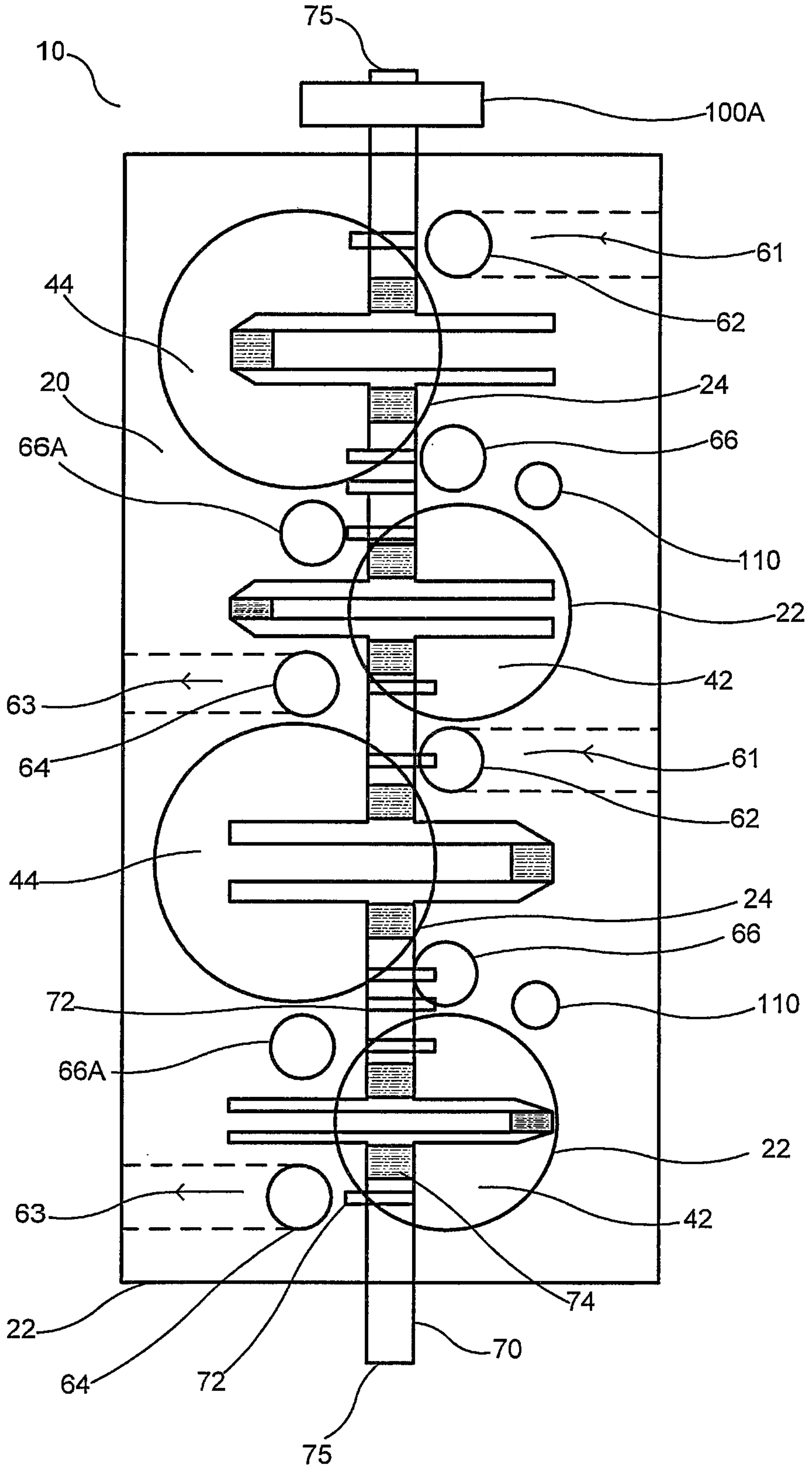
FIG. 1 is a top view of the internal combustion engine in accordance with an embodiment of the present invention.

The present invention is best understood by reference to the detailed figures and description set forth herein.

Various embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled. In the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The Design application defines the following terms: top line of achievement is when the piston is in its highest position in the cylinder, and bottom line of achievement is when the piston is in its lowest position inside the cylinder.

Unless defined otherwise, all technical and scientific terms used herein have the same meaning as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood to refer to functional equivalents of such structures. The present invention will now be described in detail with reference to embodiments thereof as illustrated in the accompanying drawings.

The Structure of the Engine.

With reference to FIGS. 1, 2A, 2B, 2C, 2D, 2E and 2F, an example of the ‘example of the internal combustion engine is illustrated in accordance with an embodiment of the present invention. In this embodiment, the internal combustion engine has a top line of achievement when the piston is in its highest position in the cylinder, and the bottom line of achievement when the piston is in its lowest position inside the cylinder. These two lines are practically important in the work of the engine.

With reference to FIG. 1 through FIG. 7, the new piston internal combustion engine has as its components parts cylinder block 20, with a front wall 22A working cylinders 22 and auxiliary cylinders 24, cylinder covers 30, working pistons 42 and auxiliary pistons 44, rods 50 and 50A operatively connected to working cylinders 22 and auxiliary cylinders 24, intake valves 62, has an intake valve sealing piston 65 which function as a valve stem seal, valve spring 69, operatively close connection to the intake channel 61 in the cylinder block 20, bypass valves 66 and 66A open and close transfer air channel 61A having a bypass valve pistons 68 and 68A, crankshaft 70 (which also functions as a camshaft), cams 72, exhaust valves 64, having an exhaust valve piston 67, operatively opens and closes exhaust channels 63 in the cylinder block 20, flywheel 100A, Hydro-compensators 105 and 100 HPFP No cylinder heads or separate camshafts are used in the present invention. The crankshaft 70 has cams 72 and bearings 74.

The engine 10 can be of many different sizes and with different cubic centimeters of working volume or displacement. A prerequisite for the engine 10 is that the number of cylinders should be an even number. That is, the smallest number of cylinders can be two, the first of which is working cylinder 22 and the second auxiliary cylinder 24 (one pair). The number of such cylinder pairs can such cylinder pairs can be increased, for example, to two pairs, three pairs, four pairs, and so on as necessary With reference to FIG. 2E, a high-pressure fuel pump 100 is preferably mounted on the cylinder block 20 to enable it to inject fuel into the auxiliary cylinder 22 space. There is a piston 115 acting as valve stem seal on a rod 117 that Clicks on HPFP. The preferred embodiments of the high-pressure fuel pump 100 is more fully described below.

Figure 2A:
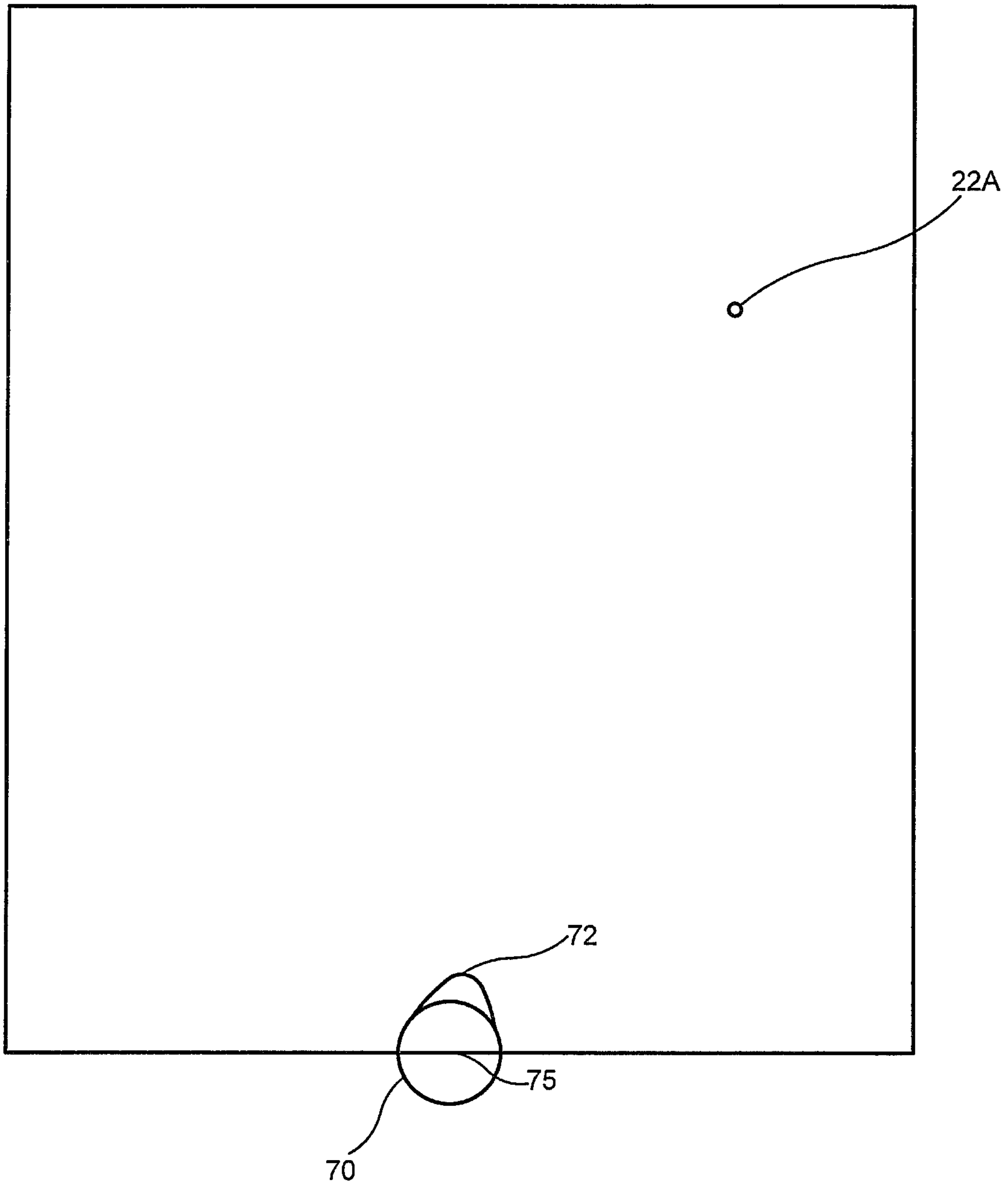
FIG. 2A is a front view of the internal combustion engine of FIG. 1, illustrating the position of the axis of the crankshaft.
Figure 2B:
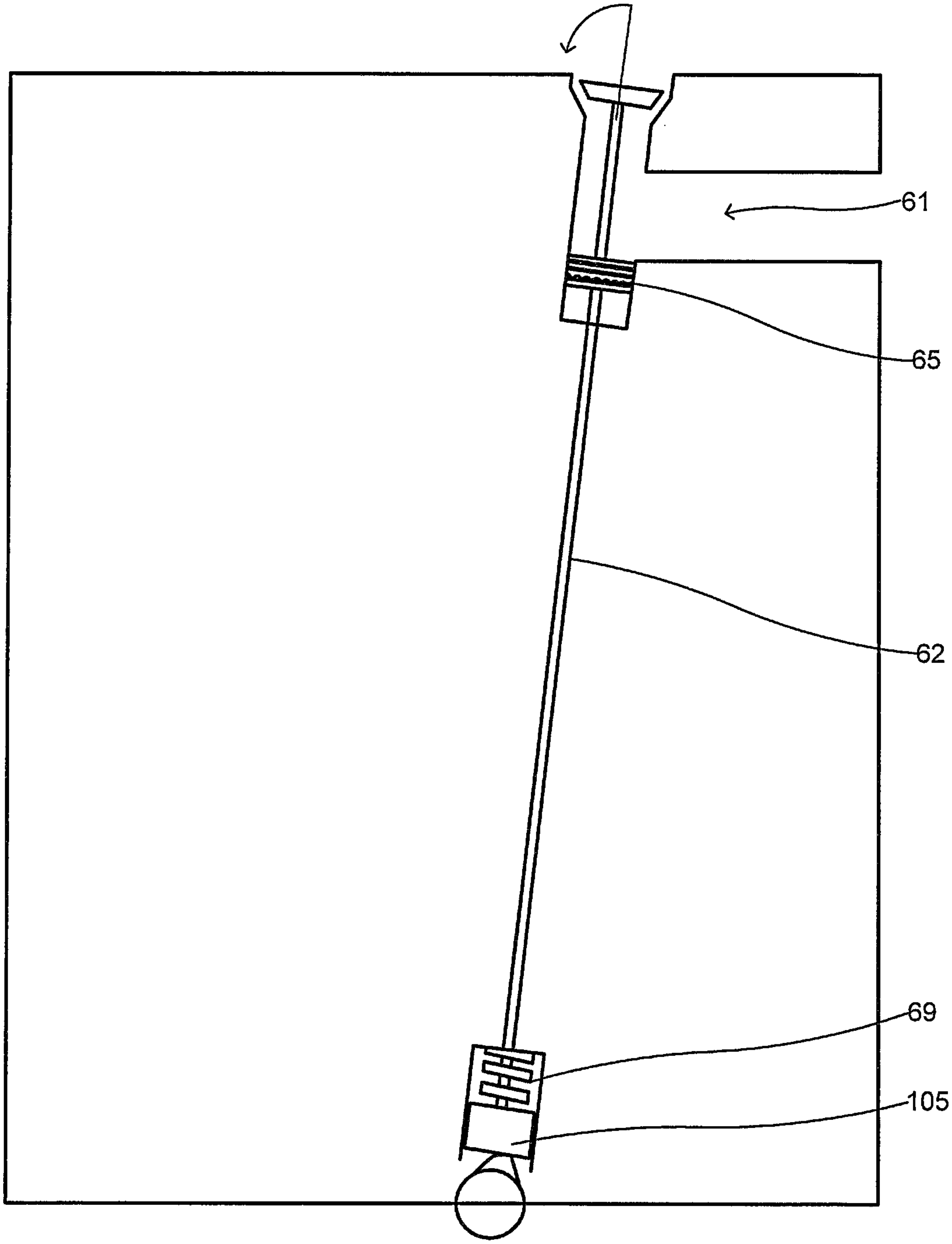
FIG. 2B is a front cross sectional view of the internal combustion engine of FIG. 1 at the intake valve, illustrating the intake valve, valve piston, and hydro compensator.
Figure 2C:
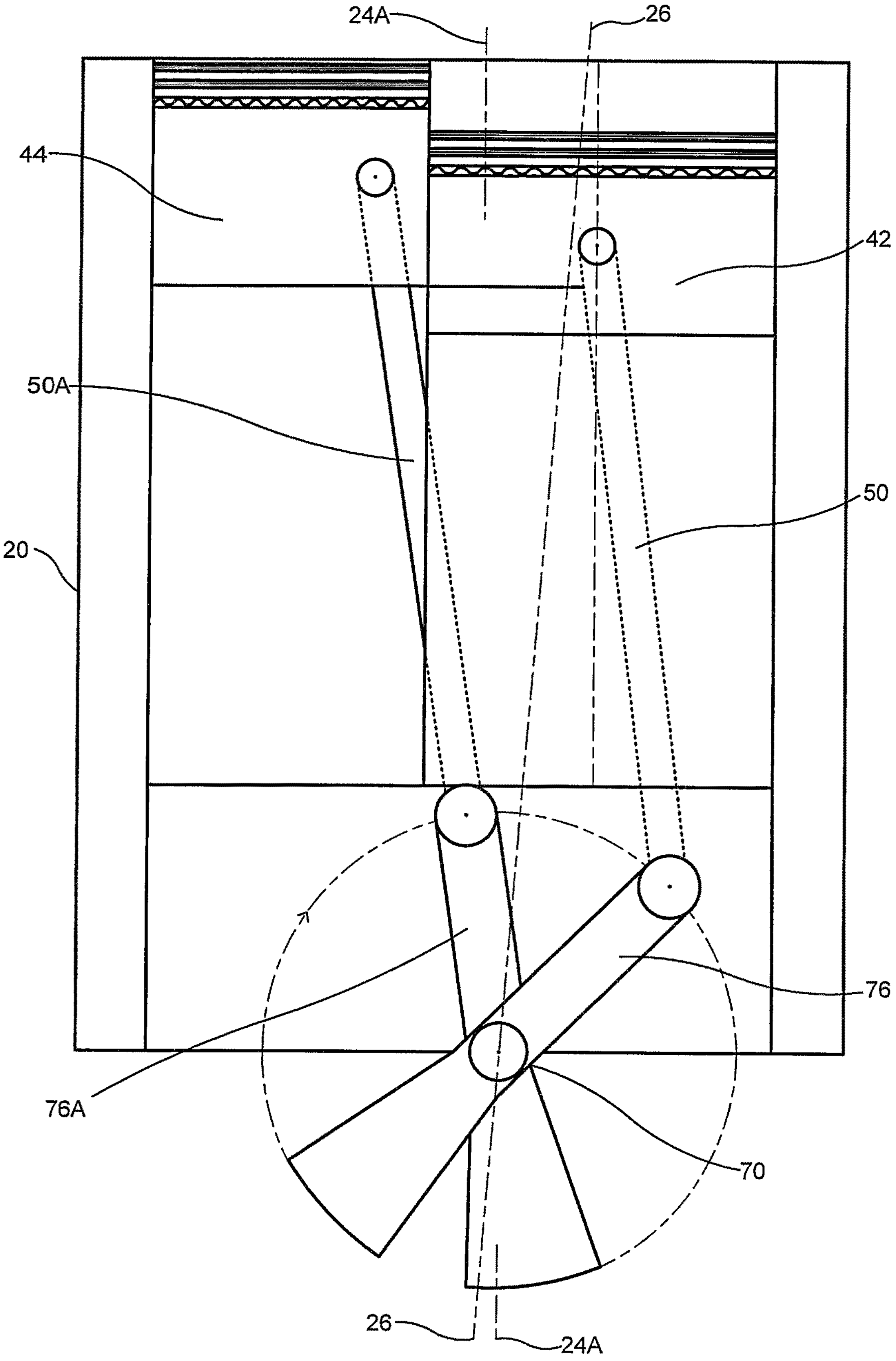
FIG. 2C is a front cross sectional view of the internal combustion engine of FIG. 1 illustrating the working piston and auxiliary piston mounted on rods inside a block of cylinders housing and a crank mechanism.
Figure 2D:
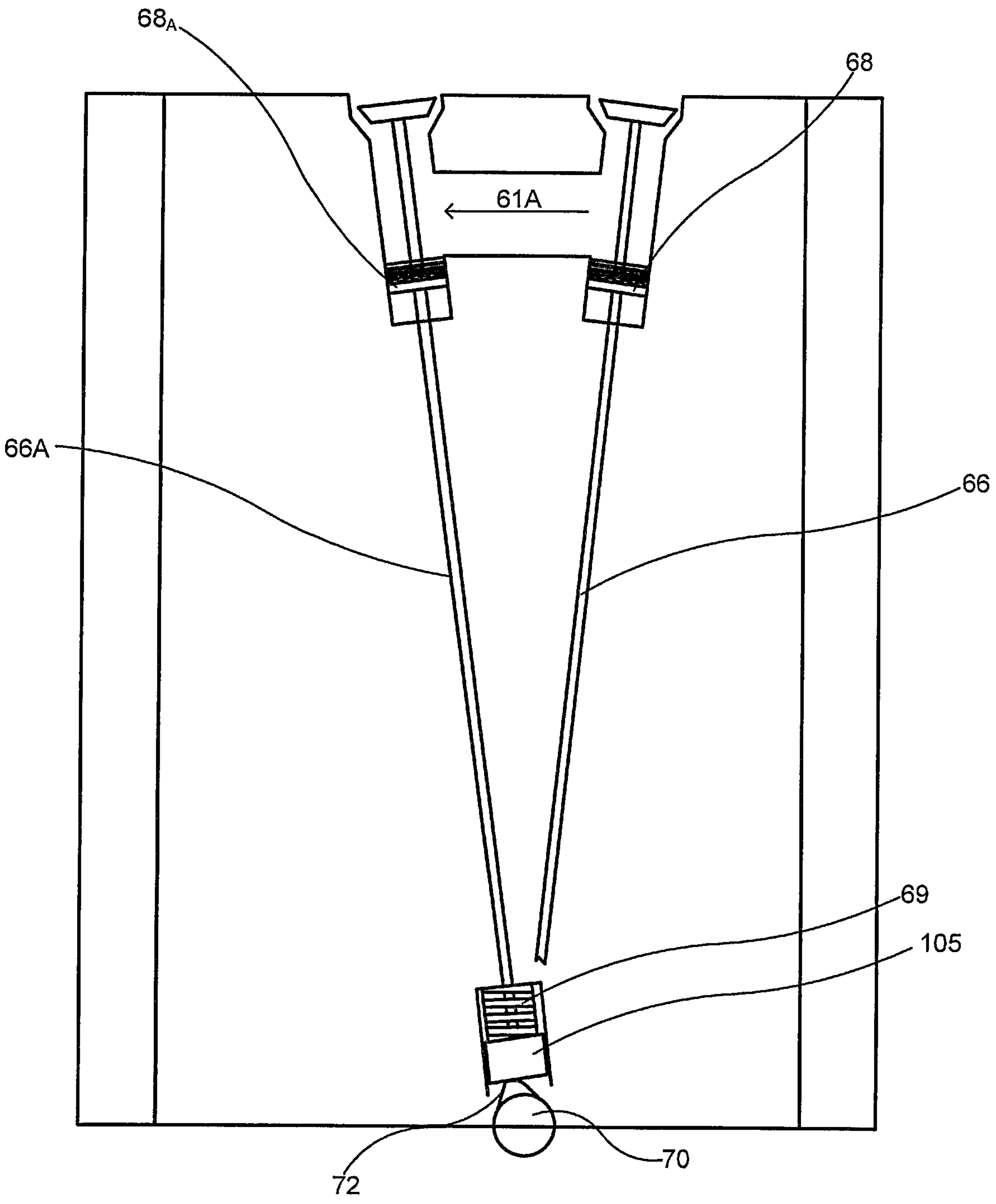
FIG. 2D is a front cross sectional view of the internal combustion engine of FIG. 1 at the bypass valves, illustrating the bypass valves.
Figure 2E:
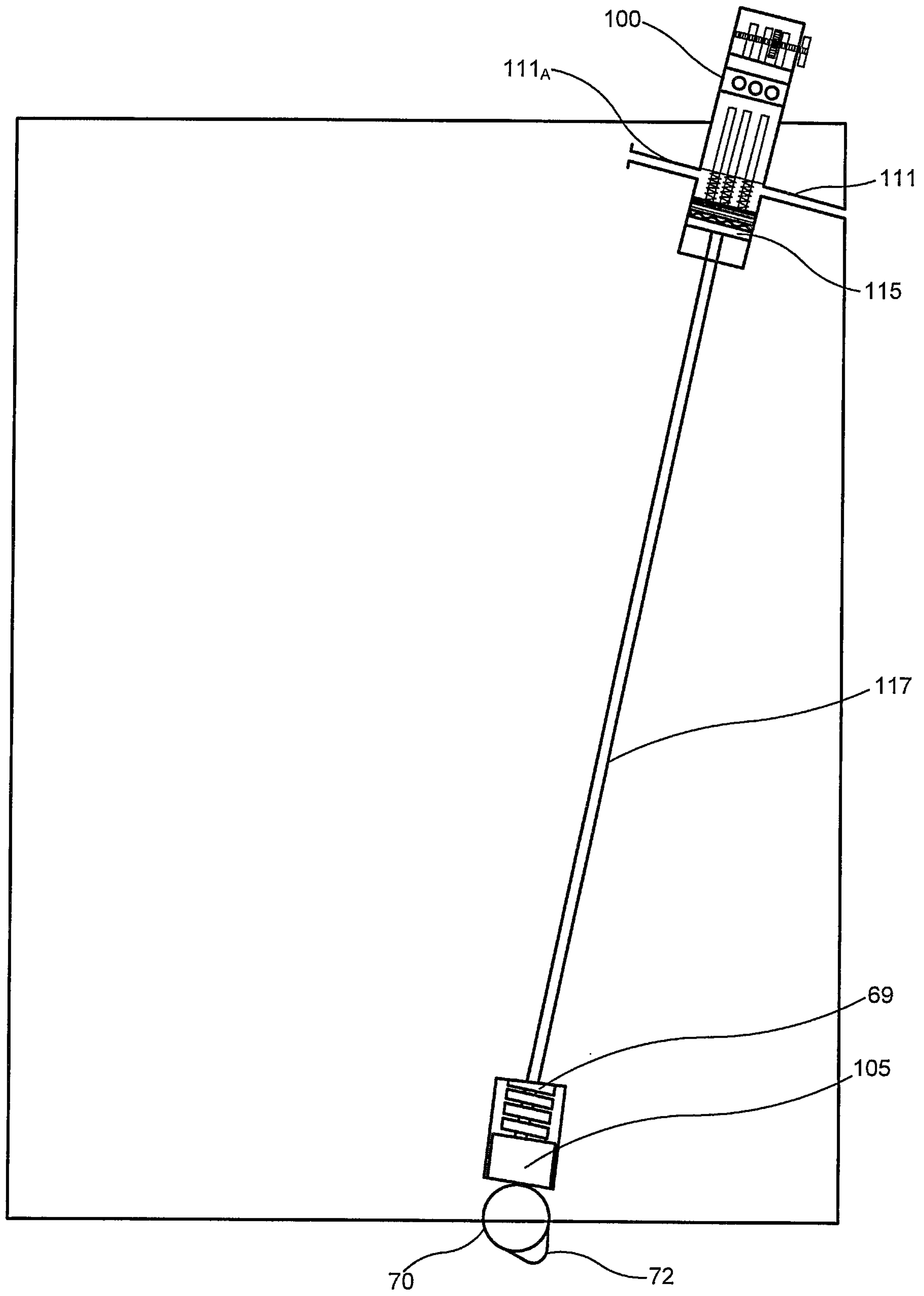
FIG. 2E is a front cross sectional view of the internal combustion engine of FIG. 1 at the high-pressure fuel pump, illustrating the high-pressure fuel pump, bar with piston, hydro compensator and spring which sets HPFP in motion.
Figure 2F:
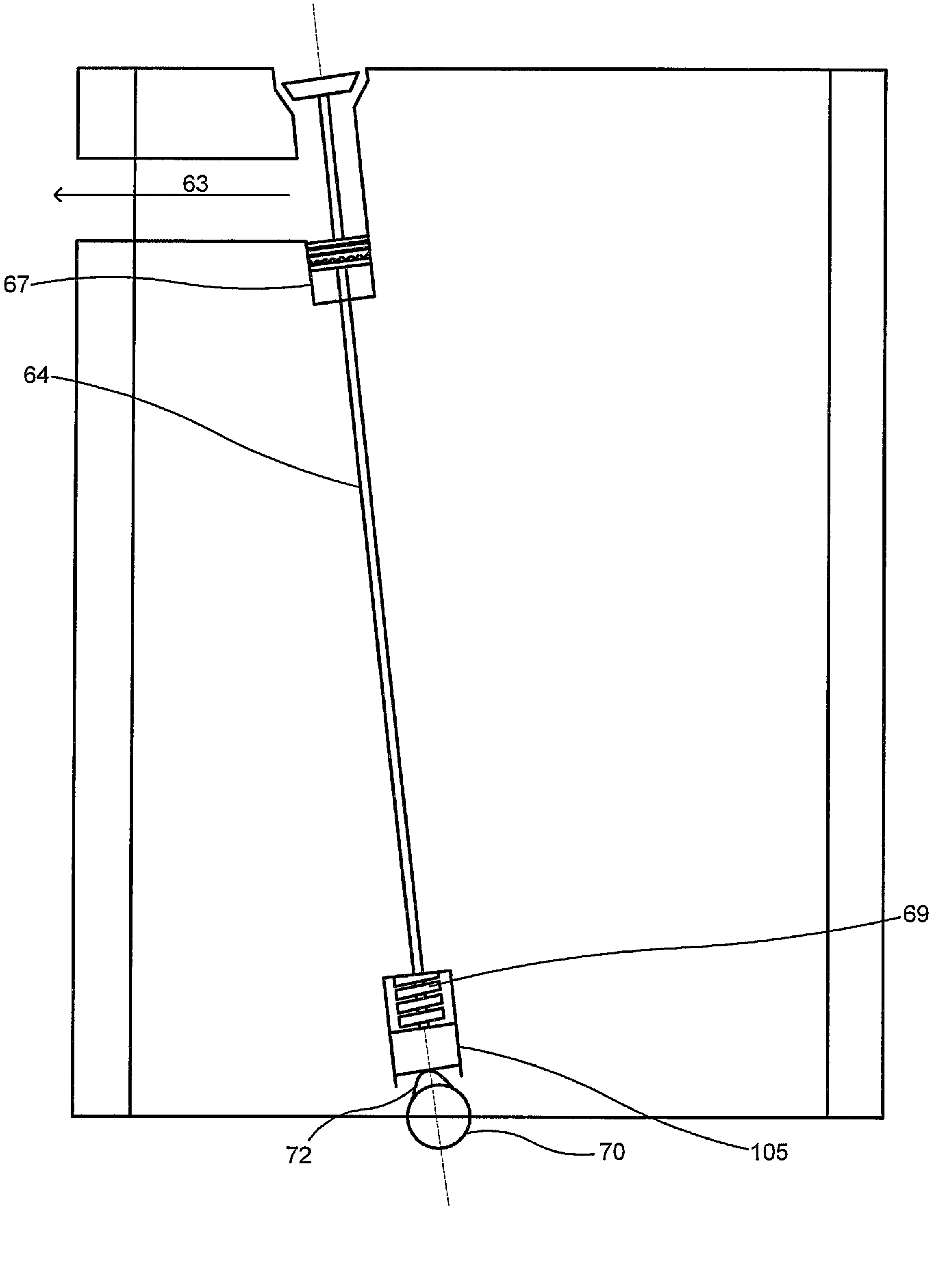
FIG. 2F is a front cross sectional view of the internal combustion engine of FIG. 1 at the exhaust valve, Illustrating the exhaust valve.

With reference to FIGS. 1 through 2F, all cylinders 22 and 24 are disposed substantially vertically in the cylinder block 20, but the cylinders 22 and 24 are shifted, the center of the working cylinder 22 shifted 50% of the size of it is radius to the right of the axis 75 of the crankshaft and the center of the auxiliary cylinder 24 shifted 63% of the size of it is radius to the left of the crankshaft from the axis 75 of the crankshaft 70 so that first, working cylinder 22 is shifted to the right and the second, auxiliary cylinder 24 that is behind the working cylinder 22, is shifted to the left if you look at the engine 10 from the front.

The working cylinders 22 and auxiliary cylinders 24 preferably have the same length or height. The diameter of the auxiliary cylinder 24 must be considerably larger than the diameter of the working cylinder 22 in order to have the ability to draw a large amount of air and provide the working cylinder 22 with the required amount of compressed air. In the preferred embodiment, the diameter if the auxiliary cylinder 24 should be greater than the diameter of the working cylinder 22 by substantially ⅕ (20%), producing a corresponding ratio of volume in cubic centimeters (i.e., the volume of the auxiliary cylinder 24 is greater than the volume of the working cylinder 22 by substantially ⅕ (20%)). This is applicable to any number of cylinders pairs (one, two, three, etc.). The diameters of the working cylinders 22 in multiple working pairs (i.e., two or more pairs) should be the same. The diameters of the auxiliary cylinders 24 in multiple working pairs should also be the same (but greater than the diameters of the working cylinders 22 as described above). Percent (ratio) difference between cylinders might be increased according to the designation of the engine (for example for the racing cars)

Since the auxiliary pistons 44 in the auxiliary cylinders 24 will be significantly larger and heavier than the working pistons 42 in working cylinders 22 due to the difference in their diameters, the crank 76A of the crankshaft 70 for the auxiliary pistons 44 must be heavier than the crank 76 for the working pistons 42. In other words, the weights of the cam mechanisms of all of the pistons must be balanced versus the weight of the pistons, so that the mechanism moves smoothly, without vibration.

The working piston 42, despite the fact that it is moving away from the cylinder cover 30 in the working cylinder 22, still continues to receive compressed air. For the engine 10 it is appropriate to consider at zero (0) Degrees is the beginning of the cycle of the working piston 42 from its top line of performance in the working cylinder 22, as illustrated. In FIG. 2C. Line 26 is at (0) degrees of the engine beginning to work and most importantly working piston begins its working cycle (Working Piston 42). The crankshaft 76 of the working piston 42 is an eternal mechanism ahead of the crank of the auxiliary piston 44 by (55) Degrees. Assuming (0) Degrees is rejected forward or right (5) Degrees from the vertical line 29 of the motor through the center of the root neck of the crankshaft 70. The vertical line 24A of the engine 10 is parallel to any vertical cylinder wall. When the auxiliary piston 44 of the upper line reaches its connecting rod, at this moment it is pulled out in a straight line with a crank and the center of its crank is at a distance of (15) Degrees from (0) Degrees of engine. And also at a distance of (10) Degrees from the vertical line of the engine. The rods of all pistons have the same length. All distances are approximate, with the distances being described as one of the preferred embodiments.

The cylinder covers 30 and 30A have a round shape to cover the cylinders 22 and 24 also cover ridges of the valve openings. Cylinder cover 30 covers pits of the exhaust valve 64 and of the bypass valve 66A; cylinder cover 30A auxiliary cylinder covers pit of the bypass valve 66 and valve 62

The engine 10 has a lower valve arrangement. On the crankshaft 70, of the axis 75 there are cams 72, above which hydro-compensators are positioned, the legs of the valves lie on them. The valves are located in the block at a certain angles-valves: 62, 66 at (6) Degrees and valves: 66A, 64 at (8) Degrees with respect to the vertical line of the engine. It is desirable that the engine has a long piston stroke to increase the time of combustion of fuel and maximize the effect of expansion of gasses. Rods Pushers of individual high pressure fuel pumps lean on hydro compensators and hydro compensators pressed to the cams of the crankshaft and fixed at a (14.5) Degrees angle to the vertical line of the engine. The bottom of the cylinders on one side has a cut to the width of the connecting rod so that the connecting rod can move freely. The (HPFP)—is attached to the surface of the cylinder block next to the cover of the working cylinder. In the cover of the working cylinders are screwed injectors 120 through which the fuel is dispensed into the cylinders. The oil pump can be driven by a crankshaft gear.

The Principle of Operation. At a time of (0) Degrees when the working piston 42 reached in its working cylinder 22 the top line of achievement, the exhaust valve 64 closes and the bypass valves 66 and 66A open in the channel connecting the working piston 42 with the auxiliary piston 44. The auxiliary piston 44 at this time makes the compression of air and its crank is it a distance of 40 Degrees from the end of its cycle, from its auxiliary cylinder 24 moves the air into the working cylinder 22 where the working piston 42 is.

The working piston 42 then starts moving down and moving away from the top line of achievement and receives compressed air in the limited space of its working cylinder 22. The filling with the compressed air takes place from (0) Degrees to (40) Degrees. In spite of the fact that there is limited space in the cubic dimension increases and yet the required air pressure will provide the auxiliary piston 44 which is larger in diameter than the working piston 42.

With reference to FIG. 2C, Working piston 42 starts off it's working cycle at (0) Degrees, it is it's top line of achievement, it's connecting rod and crank mechanism 76 at that moment would form a straight line moving down. Piston 42 moving away from the top line of achievement and during that process it's crank mechanism would form an angle and upon that angle reaching (40) Degrees, at that moment bypass valves 66 and 66A are closing. After that there is a diesel fuel injection into the working cylinder (for a diesel type of engine) which lights up immediately or spark plug ignition (for all other engines). At the moment when the auxiliary piston 44 reaches its top line of achievement, connecting to the channel 61A through the bypass valves 66 are closed FIG. 2D between the auxiliary cylinder 24 and the working cylinder 22. The auxiliary piston 44 has completed its cycle. The intake valve 62 opens the intake channel 61, which is the path between the atmospheric air and the auxiliary cylinder 24. The auxiliary piston 44 begins to repeat the new cycle and so the air intake moves toward the bottom of the line (bottom line of achievement). After reaching the bottom line of achievement, the intake valve 62 will close and the auxiliary piston 44 will start the air compression cycle, moving towards its top line of achievement.

After the bypass valves 66 and 66A are closed in the working cylinder 22 through the cylinder cover 30, special injectors 200 inject the diesel fuel that instantly lights up in a diesel engine or a spark plug ignition for all other types of engines. For engines working on gasoline, kerosene, alcohol, or various gasses, these liquids or gasses can enter the working cylinder 22 in various ways. For example, the fuel may enter through a bypass valve 66 or by direct injection into the working cylinder 22, which is also possible and before the closure of the bypass valve and after its closure-(the one that provides the tightness of the working cylinder) 66A.

In gasoline and similar (non-diesel) engines, a spark ignites a mixture of air and combustible material. Powerful expansion of gasses moves the working piston 42 to its bottom line of achievement. It is important to note that the positioning of the crank of the working piston's position is such that it enables it to receive and use the maximum amount of the energy created by the burning and expansion of gasses. The working piston 42 after completing its working cycle reaches its bottom line of achievement, and at this moment the exhaust valve 64 of the working cylinder 22 opens the exhaust valve 64 starts with the removal of exhaust gasses from the working cylinder 22 beyond its limits. The working piston 42 begins to move in the direction towards its top line of achievement, and when it is reached, the exhaust valve 64 closes with the subsequent opening of the bypass valves 66 and 66A. Cycles are repeated due to internal rotation of the crankshaft 70 and the flow of fuel and air into the working cylinders 22.

The proposed high pressure fuel pump 100 for each individual working cylinder 22, which has several significant advantages and benefits:

The piston of the plunger does not intersect with the side hole that protects the plunger pair from damage. A short and thin fuel tube from the pump housing to the nozzle, which maintains high fuel pressure until the fuel injection into the working cylinder.

Each working cylinder of the engine has six fuel sprayers, and this makes it possible for the needles in the sprayers to be lifted for a very short time, even with the maximum amount of fuel injected into the cylinder, which protects the spray needles from slagging. The fuel pump does not need a chain to drive in into operation.

High-Pressure Fuel Pump and Injectors. The high-pressure fuel pump 100 for an injector 200 or 200A to have the necessary fuel pressure for a good atomization. The fuel pipe 206 is thick and not long. In this specific embodiment, the pressure loss is minimized.

The high-pressure fuel pump 100 and injectors 200 and 200A described in this application will be able to supply and inject diesel fuel or other fuel into the working cylinders 22. However, gasoline must be injected before the bypass valves 66 and 66A are closed. Diesel fuel must be injected after the bypass valves 66 and 66A are closed.

Figure 3:
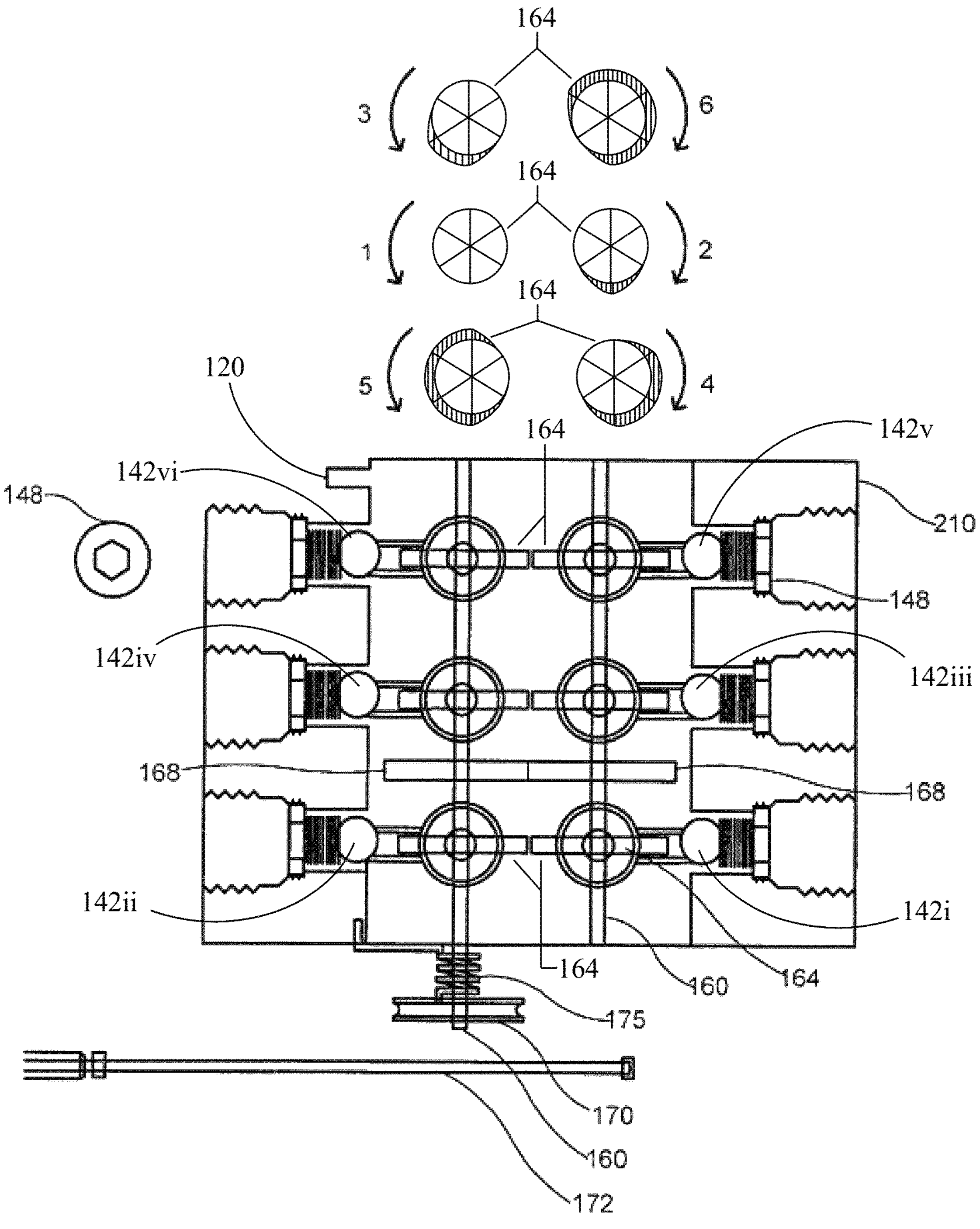
FIG. 3 is a top view of a preferred embodiment of a high-pressure fuel pump of the internal combustion engine of FIG. 1.
Figure 4:
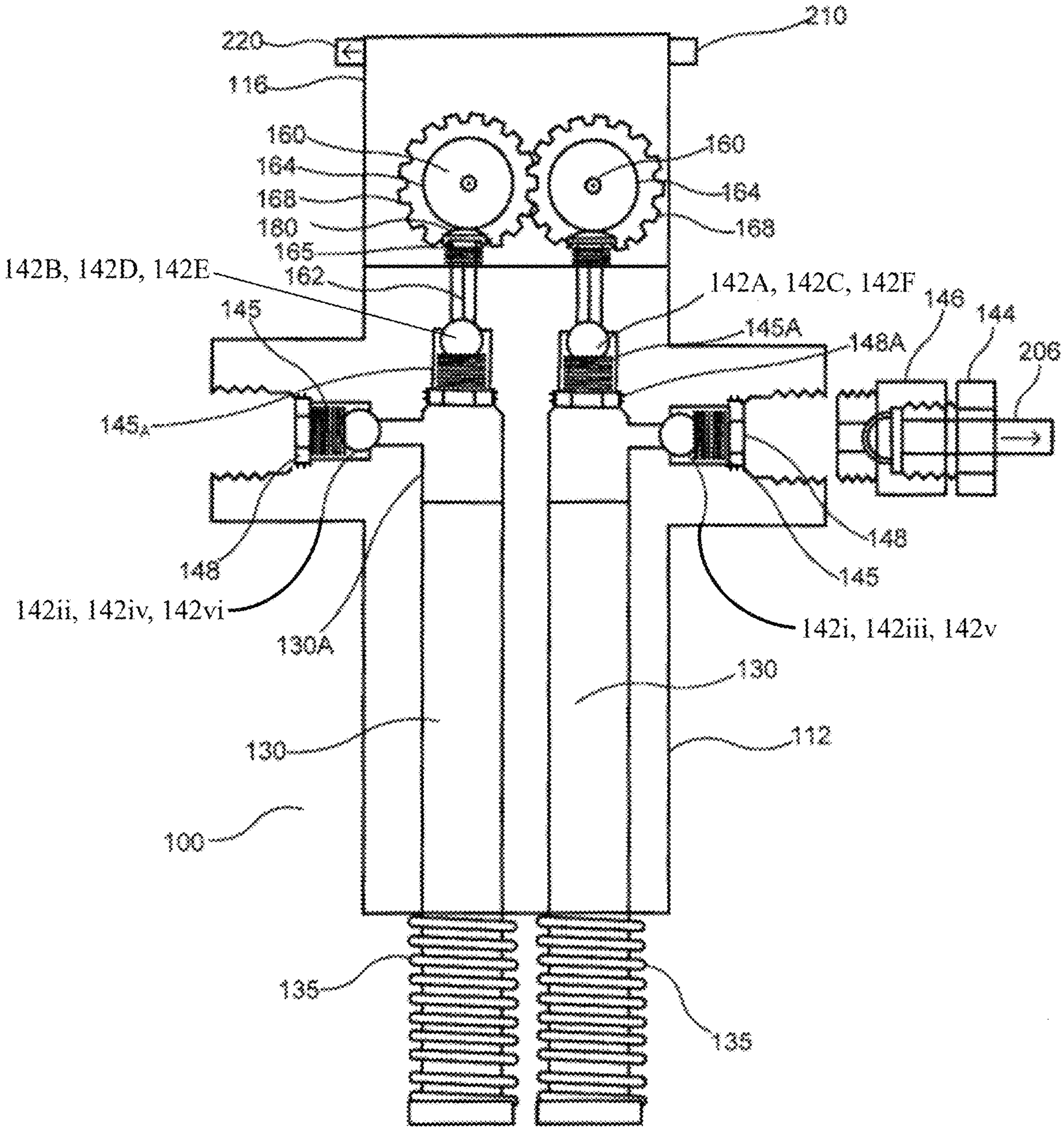
FIG. 4 is a cross sectional side view of the high pressure fuel pump of FIG. 3, with the cross section at the gears.

With reference to FIGS. 3-4, the high-pressure fuel pump 100 for each working cylinder 22 consists of a housing 112 in which there are six pump plungers 130 inserted through the bottom of the housing 112, on the bottom of which pump plungers 130 there are attached plunger springs 135. The pump housing 112 serves as a single plunger pair for all six pump plungers 130. All pump plungers 130 are simultaneously driven upwards by a rod 117 with a piston pin 115. Each plunger piston 130 creates in its channel a high pressure of a diesel fuel and pushes it through an individual valve to pipe 206. Metal ball 142*i*, 142*ii*, 142*iii*, 142*iv*, 142*v*, 142*vi* with a spring 145 and nut 148 that together perform the function of the return valve. After this valve, the diesel fuel passes through the tube 206 to injector 200 or 200A which sprays the fuel into the cylinder 22. The fuel travels from the top down and is not released back, and from the sides of the fuel is injected through the tubes to the injectors. Pump plunger 130 is constantly moving up and down. When the pump plunger 130 moves down, it creates a vacuum, and when the pump plunger 130 moves up, it creates pressure.

With reference to FIG. 4, from the top 116 fuel reservoir on the housing 112 there are six valves with parts 142A (142B, 142C, 142D, 142E, 142F), 145A, 148A, 130A through which the diesel fuel is supplied into the middle to each plunger cylinder 130A.

Also on top of each metal ball 142A, 142B, 142C, 142D, 142E, 142F is a regulated push button by pressing on which the return valve will be open. The return valve is kept closed by the valve spring 145A between the metal ball 142A, 142B, 142C, 142D, 142E, 142F and the valve nut 148A mounted below the spring 145A as illustrated in FIG. 4. When reverse valve is open, the pressure of diesel fuel is not created and this or that plunger does not supply diesel fuel to its nozzle. So, if only one reverse valve is closed, only one nozzle will be spraying fuel into the cylinder and this will provide engine idle. When closing each successive check valve, engine speeds will increase to the maximum. Reducing the engine speed occurs when you press on each alternate check valve, thereby depressing the cylinder of the plungers. In the upper part of the high pressure fuel pump 100 there are two rows of openings in three apertures in each row. Each aperture is equipped with a pusher 162 with its reverse spring 165. Above these two rows of clicks are two axles 160 with disks 164 over each click. Disks 164 are round and they have elliptical shapes of their edges. Each disk 164 has a cut edge of a circle of different lengths. If the disc is rotated to its tap with the cut side of its tap with the cut side of its circle, then at this position the pusher 162 is raised by its reverse spring 165 and the pusher 162 does not press the metal ball 142A, 142B, 142C, 142D, 142E, 142F of the valve, while the plunger impulsively pours fuel into the working cylinder. If the disc 164 is rotated to the scroll without a cut off part of its circle, the pusher 162 is pressing on that metal ball, keeping the return valve open, and the plunger 130 does not feed the fuel into the working cylinder.

Both axles 160 with disks 164 have gears 168 of the same size that interact with each other as illustrated in FIG. 4. If one axle 160 is driven, it simultaneously drives the other axle 160 because the teeth of the gears 168 attached to the axles 160 are in operative connection with one another. Above the fuel reservoir 116 in which the axles 160 with discs 164 and gears 168 are filled with fuel. Fuel to the top of the HPFP reservoir 116 enters from the car's fuel tank through the incoming fuel pipe 210 with the help of a pump of a car's fuel tank. The excess fuel is returned to the fuel tank of the car by an output fuel pipe tube 220. One end of one axle 160 comes out of the fuel reservoir outside and the pulley 170 is connected to the end of the axle 160 that protrudes beyond the housing 116. The pulley 170 is held in place by a reverse spring 175 between the pulley 170 and the housing 116. A gas cable 172 is fastened to the pulley 170 on one end of the gas cable 172. The opposite end of the cable 172 is attached to the gas pedal.

Top Part to Click 180, Spring 165, Lower Part of the Click 162

Figure 5:
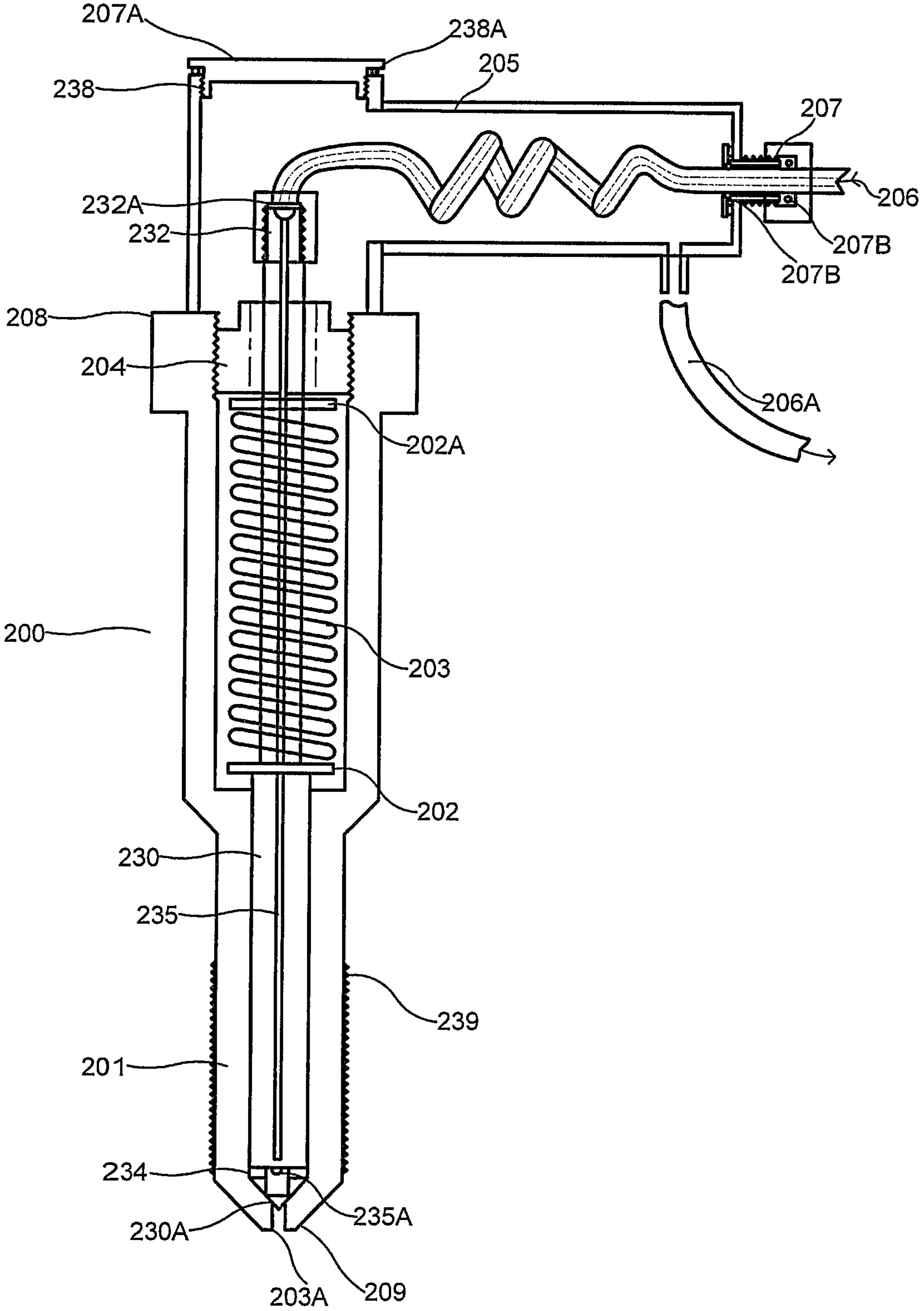
FIG. 5 is a side view of one embodiment of the nozzle (injector) of the present invention.
Figure 6:
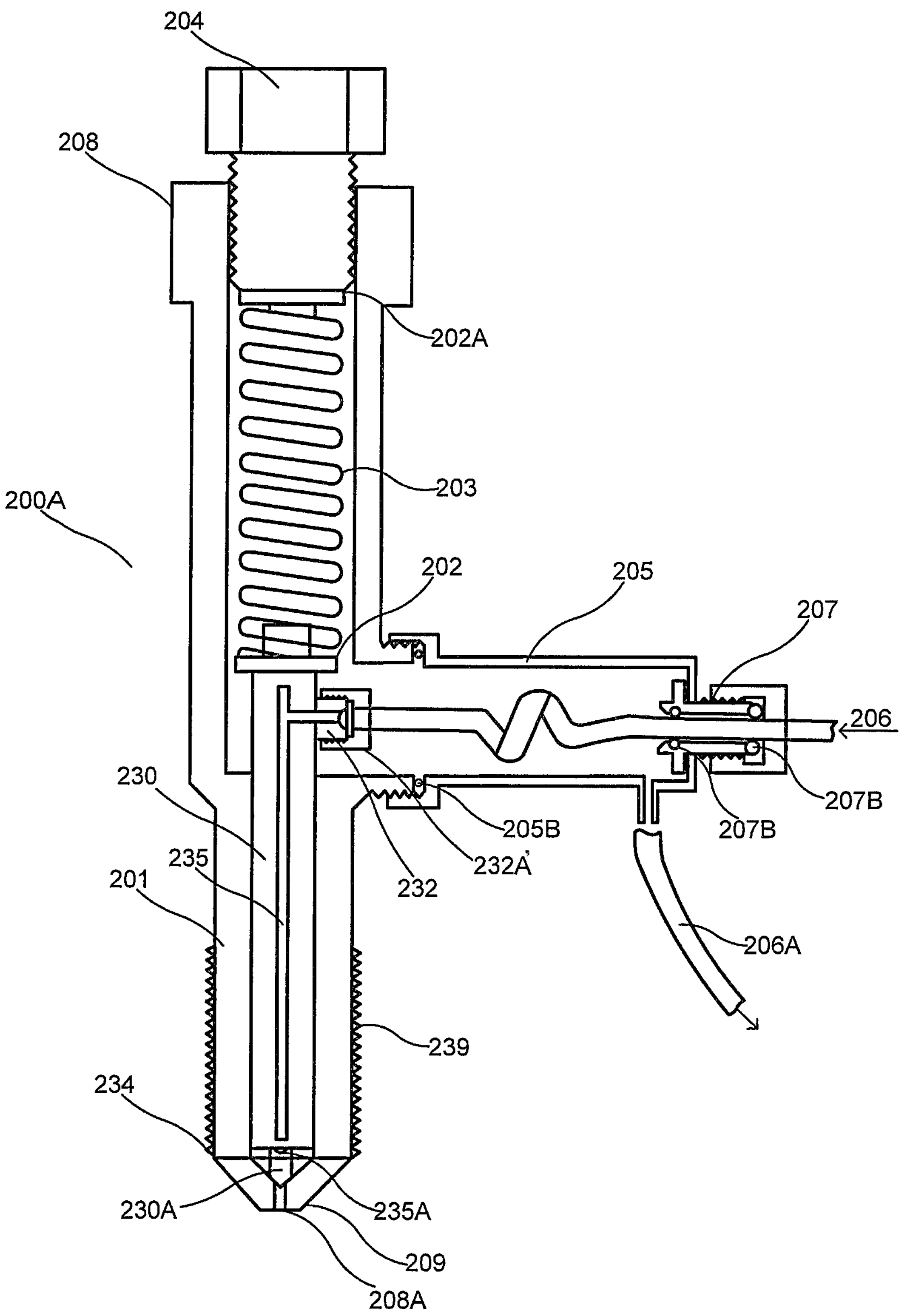
FIG. 6 is a side view of another embodiment of the nozzle (injector) of the present invention.

High-Pressure Direct Injection Fuel Nozzle. Novel injector (nozzle) structure. A new injector (nozzle) is designed to inject and disperse diesel or gasoline fuel into the engine cylinders. With reference to FIG. 5 and FIG. 6, the injector (nozzle) 200 and 200A preferably has the following components: a body 201 with a top part 208 that is preferably hexagonal in cross-section so that the injector (nozzle) 200 and 200A may be screwed into the cylinder cover 30 with a wrench. Alternatively, top part 208 may have other shapes that are compatible with wrenches and other tools for mounting, securing, or screwing in the part.

The body 201 has a needle 230 inside, a bottom spring washer 202 and a top spring washer 202A, a spring 203 between the bottom spring washer 202 and a top spring washer 202A, leaning on the needle 230, a bolt 204 pressing the spring 203 (exerting pressure against the spring 203), a tank (reservoir) 205 for return fuel outflow, a high-pressure fuel pipe 206, a bolt and nut 207 sealing the high-pressure fuel pipe 206 at the place of its entry (connection) into the fuel outflow tank (reservoir) 205. The needle 230 has a top 232, to which the high-pressure fuel pipe 206 from the high pressure fuel pump is connected, and the bottom 234, which extends approximately to the end of the body 201. The bottom of the needle 230 is preferably substantially flat to ensure that the fuel pressure in the pressure chamber 234 would more easily tolerate the raising of the needle 230, and the shape of the bottom 234 is preferably conical to 230 ensures that the fuel, at the moment of raising the needle 230, be more easily directed and injected into the working cylinder.

The tank (reservoir) 205 is preferably welded to the top part 208 of the body 201, FIG. 5 and the tank (reservoir) 205 has a removable or openable cover 207A, which is preferably screwed into the top of the tank (reservoir) 205 using threading 238. There may be an optional ring 238A, which is preferably a silicone or rubber o-ring, between the top of the tank (reservoir) 205 and the cover 207A. The bolt and nut 207 has one or more rubber ring 207B for securing the high-pressure fuel pipe 206 and preventing fuel leaks. The tank (reservoir) 205 also has pipe 206A at the bottom, for removing the unused fuel back into the filter.

The needle 230 has a sharp tip 230A, which is entirely housed in and protected by the body 201. The bottom part 209 of the body 201 further has an aperture 209A through which the fuel is injected. The aperture 209A may have slanted cuts to impart a spin on the fuel being injected through the aperture 209A (similar to a whirlwind effect).

The principle of operation of the novel high-pressure fuel nozzle is as follows: from the high-pressure fuel pump 100, the fuel flows to the injector (nozzle) 200 through the high-pressure fuel pipe 206. The high-pressure fuel pipe 206 passing through the tank (reservoir) 205 is connected to top 232 of the needle 230, preferably substantially perpendicularly to the needle 230. The needle 230 rums substantially over the entire length of the body 201. The needle 230, over its length from the top 232 and right up to the bottom, which is inserted into the pressure chamber 234, has a fuel channel 235 drilled through it longitudinally. The fuel enters the pressure chamber through the fuel channel 235 in the needle 230. The fuel channel 235 does not reach the sharp tip 230A, but comes substantially close to it, and two apertures 235A are drilled through the sharp tip 230A to meet or intersect with the fuel channel 235, preferably under (45) Degrees angle. A different number of apertures may be used and the angle of the cuts may be varied as needed. When the fuel pressure in the pressure chamber under the needle 230 raises, the needle 230 is raised and the fuel enters into the working cylinder through the aperture 209A in the bottom part 209 of the body 201.

A characteristic part of the design of the injector (nozzle) 200 is that the upper part of the needle 230 vibrates when raised and lowered, and the high-pressure fuel pipe 206, which is attached to the needle 230 (preferably perpendicularly), moves with it. This part of the high-pressure fuel pipe 206 oscillates (vibrates) freely and is protected from damage by the tank (reservoir) 205 for return fuel outflow. The needle 230 may have has circumferential grooves A round it for better compression, friction reduction and fuel retention from return flow.

An alternative embodiment of the injector (nozzle) 200 is illustrated in FIG. 6. The difference from the embodiment illustrated in FIG. 5 is the mounting of the tank (reservoir) 205 and the high-pressure fuel pipe 206 approximately in the center of the body 201 (versus approximately at the top in the embodiment illustrated in FIG. 5). With reference to FIG. 6, the injector (nozzle) 200 has a body 201 with a top part 208 that is preferably hexagonal in cross section so that the injector (nozzle) 200 may be screwed into the cylinder cover 30 with a wrench. Alternatively, top part 208 may have other shapes that are compatible with wrenches and other tools for mounting, securing, or screwing in the part.

The body 201 has a needle 230 inside, a bottom spring washer 202 and a top spring washer 202A, a spring 203 between the bottom spring washer 202 and a top spring washer 202A, leaning on the needle 230, a bolt 204 pressing the spring 203 (exerting pressure against the spring 203), a tank (reservoir) 205 for return fuel outflow, a high-pressure fuel pipe 206, a bolt and nut 207 sealing the high-pressure fuel pipe 206 at the place of its entry (connection) into the fuel outflow tank (reservoir) 205. The needle 230 has a top 232, to which the high-pressure fuel pipe 206 from the high pressure fuel pump is connected using nut 232A. The bottom of the needle 230 is preferably substantially flat to ensure that the fuel pressure in the compression chamber would more easily tolerate the raising of the needle 230, and the shape of the bottom 234 is preferably conical to ensure that the fuel, at the moment of raising the needle 23, be more easily directed and injected into the combustion chamber.

On FIG. 6 The tank (reservoir) 205 is preferably screwed on the body 201 approximately mid-way between the top part 208 and the bottom part 209. The tank (reservoir) 205 has a cooperating treading 205A for mounting on the body 201. There may be an optional ring 205B, which is preferably a silicone or rubber o-ring, between the tank (reservoir) 205 and the body 201. The bolt and nut 207 has one or more rubber ring 207B for securing the high-pressure fuel pipe 206 and preventing fuel leaks. The tank (reservoir) 205 also has a pipe 206A at the bottom, for removing the unused fuel back into the filter.

The needle 230 has a sharp tip 230A, which is entirely housed in and protected by the body 201. The bottom part 209 of the body 201 further has an aperture 209A through which the fuel is injected. The aperture 209 A may have slanted cuts to impart a spin on the fuel being injected through the aperture 209A (similar to a whirlwind effect).

The principle of operation of the novel high-pressure fuel nozzle is as follows: from the high-pressure fuel pump 100, the fuel flows to the injector (nozzle) 200 or 200A through the high-pressure fuel pipe 206. The high-pressure fuel pipe 206 passing through the tank (reservoir) 205 is connected to top 232 of the needle 230, preferably substantially perpendicularly to the needle 230. The difference from the previous preferred embodiment is the point of attachment of the high-pressure fuel pipe 206 versus the spring 203: whereas in that embodiment the attachment was above the spring 203 and bolt 204, in this embodiment the high-pressure fuel pipe 206 is attached to the top 232 of the needle 230 below the washer 202, which is below the spring 203 and the bolt 204. This is because the needle 230 does not run through substantially the entire length of the body 201, but the top 232 of the needle 230 is disposed between the top part 208 and the bottom part 209 of the body 201, preferably approximately in The center of the body 201. The bottom part 209 of the body 201 may have threading 239 for removably mounting the injector (nozzle) 200 into the cylinder cover.

The needle 230, over its length from the top 232 and right up to the bottom, which is inserted into the pressure chamber 234, has a fuel channel 235 drilled through it longitudinally.

The fuel enters the pressure chamber through the fuel channel 235 in the needle 230. The fuel channel 235 does not reach the sharp tip 230A, but comes substantially close to it, and two apertures 235A are drilled through the sharp tip 230A to meet or intersect with the fuel channel 235, preferably under (45) degrees angle. A different number of apertures may be used and the angle of the cuts may be varied as needed. When the fuel pressure in the pressure chamber under the needle 230 raises, the needle 230 is raised and the fuel enters the cylinder through the aperture 209A in the bottom part 209 of the body 201.

Specificity trait of the design of the injector (nozzle) 200A (drawing of the nozzles 200 and 200A are scaled up 3:1) is that the upper part of the needle 230 vibrates when raised and lowered, and the high-pressure fuel pipe 206, which is attached to the needle 230 (preferably perpendicularly), moves with it. This part of the high-pressure fuel pipe 206 oscillates (vibrates) freely and is protected from damage by the tank (reservoir) 205, mounted approximately in the center of the body 201 for return fuel outflow. The needle 230 may have circumferential grooves around it for better compression, friction reduction and fuel retention from return flow.

Figure 7:
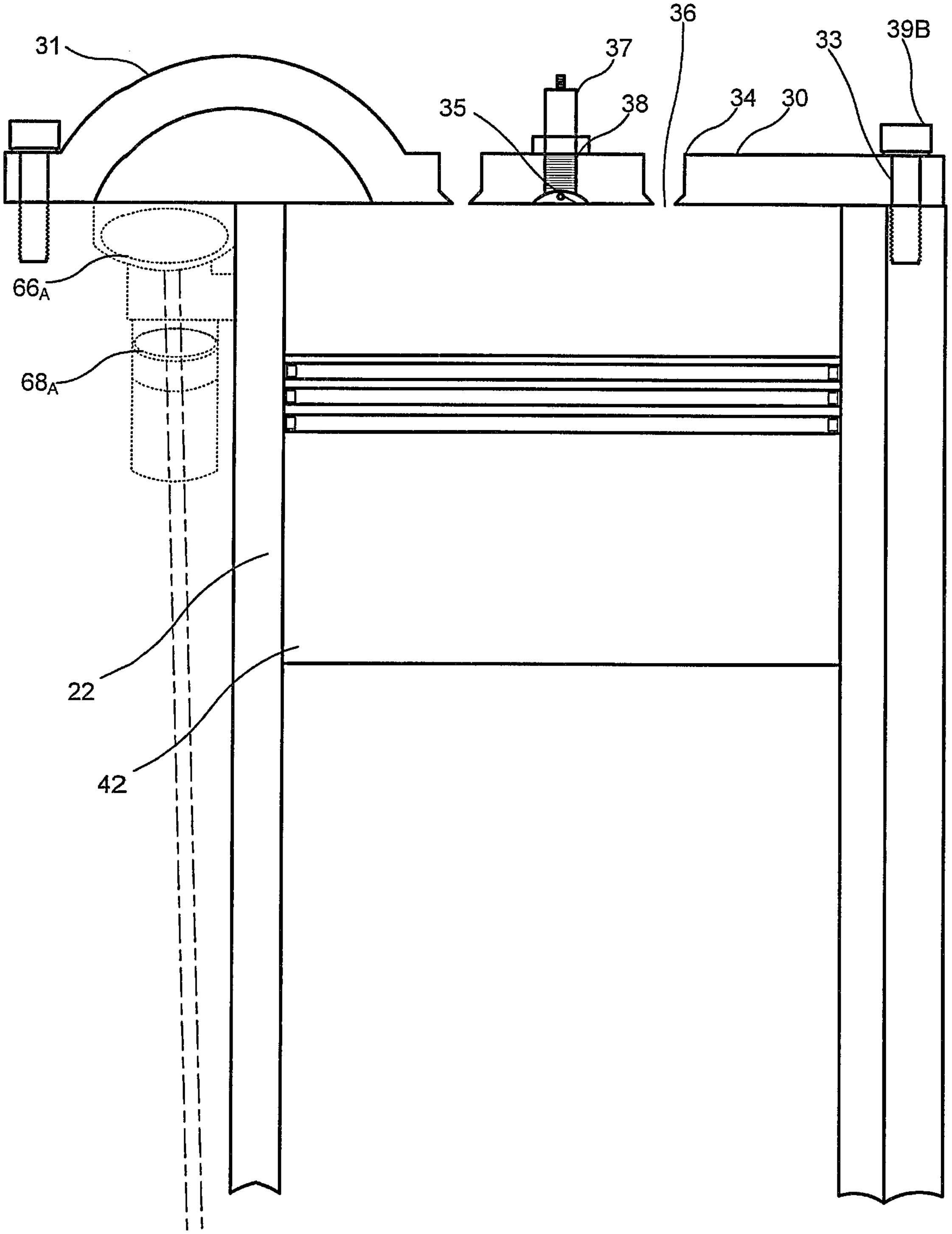
FIG. 7 is a side cross sectional view of the working piston, cylinder cover, spark plug and the nozzle (injector) of the present invention for a gasoline engine.

With reference to FIG. 7, which is a side cross sectional view of the working piston 42, cylinder cover 30, spark plug 38 with thread for spark plug 37, 35 hollow for spark plug electrodes, and the special holes around the spark plugs for screwing in the injector nozzle 200 or 200A. Additionally this design could be adjusted for use with elongated spark plugs which would ensure that fuel ignition is centered.

The spark plug with a thrust in the center of a piston allows the combustion to be close to the center of the total mass of the combustible mixture. It is helpful in the engine is a large turbulence of the air mass in the limited cylinder space at the time of self-combustion or spark combustion. As the result of many properties and design parameters, the novel engine has a high efficiency. There is a possibility to use elongated spark plugs which were specifically designed for this engine, however based on chemical reaction it might be more practical to use regular sized spark plugs.

Figure 7A:
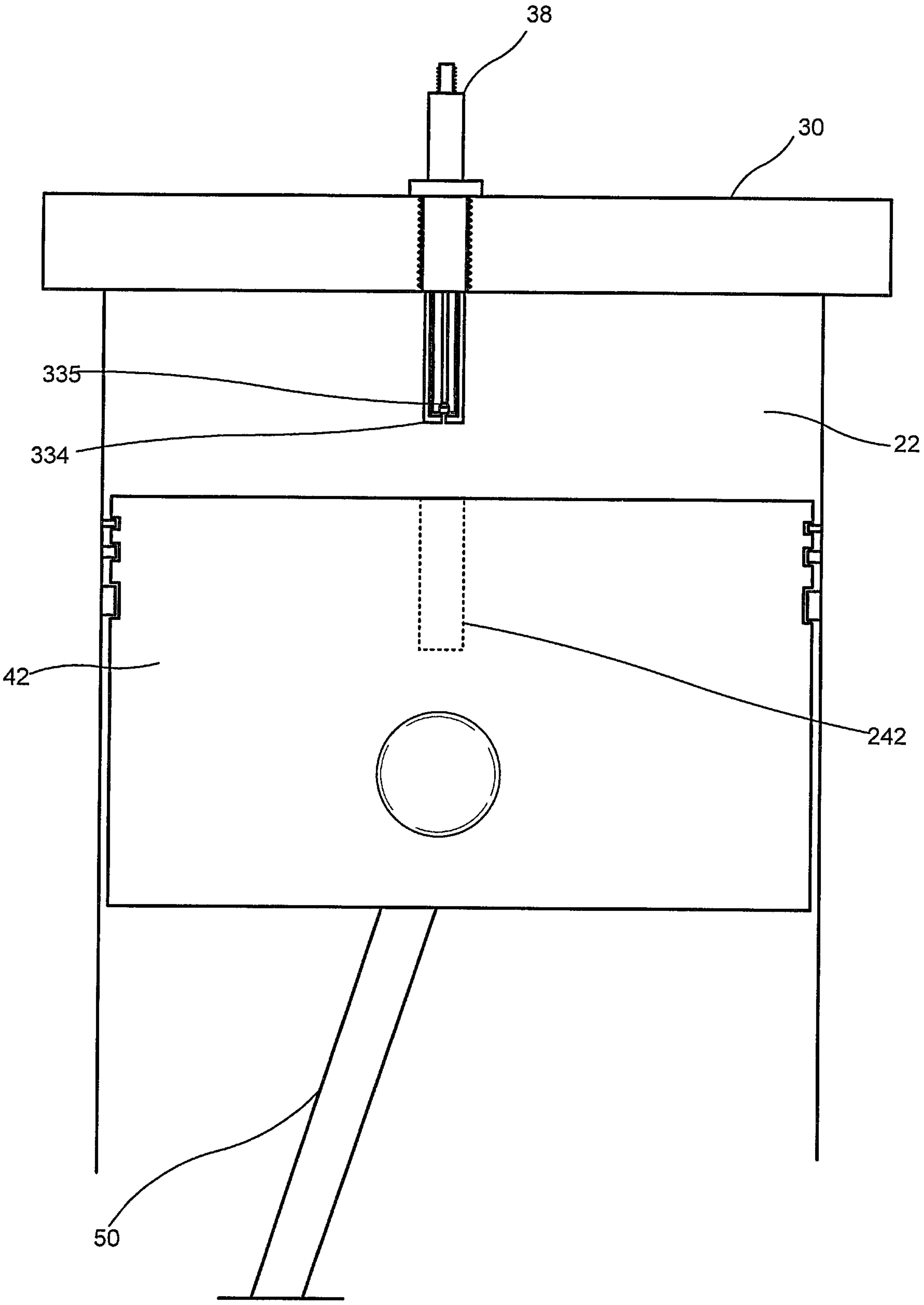
FIG. 7A shows that the working cylinder of FIG. 7 having a reciprocating cavity, which allows the working piston to fully reach its top position without hitting or damaging the bottom of the spark plug.

In operation, the injector (nozzle) 200 may be used in combination with the spark plug as illustrated in FIG. 7: using threading 239, the body 201 is screwed into the cylinder cover 30. The top 232 of the injector (nozzle) 200 or 200A is positioned above the cylinder cover 30. The bottom 209 of the body 201 does not protrude into the combustion chamber to ensure it does not get hit by the moving working piston 42 and protects them from being exposed to high temperature. On a FIG. 7A the working cylinder 42 has a reciprocating cavity 242, which allows the working piston 42 to fully reach its top position without hitting or damaging the bottom 334 of the spark plug 300, which ignites gasoline in the combustion chamber. For the diesel engine instead of the spark plugs fireproof glass could be installed in the middle of the cylinder cover 30 to enable to observe the burning process in a working cylinder.

Figure 9:
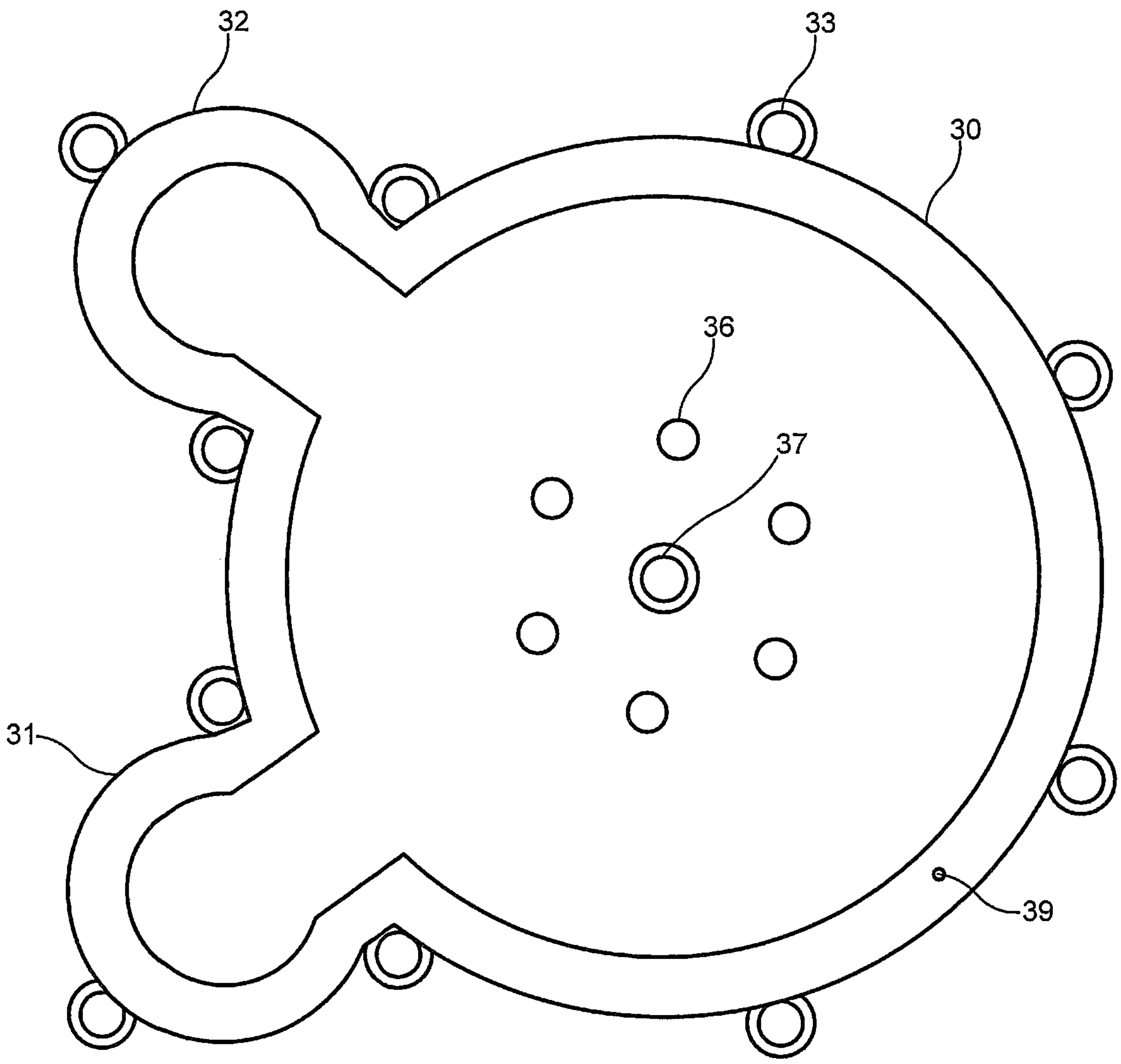
Figure 9T:
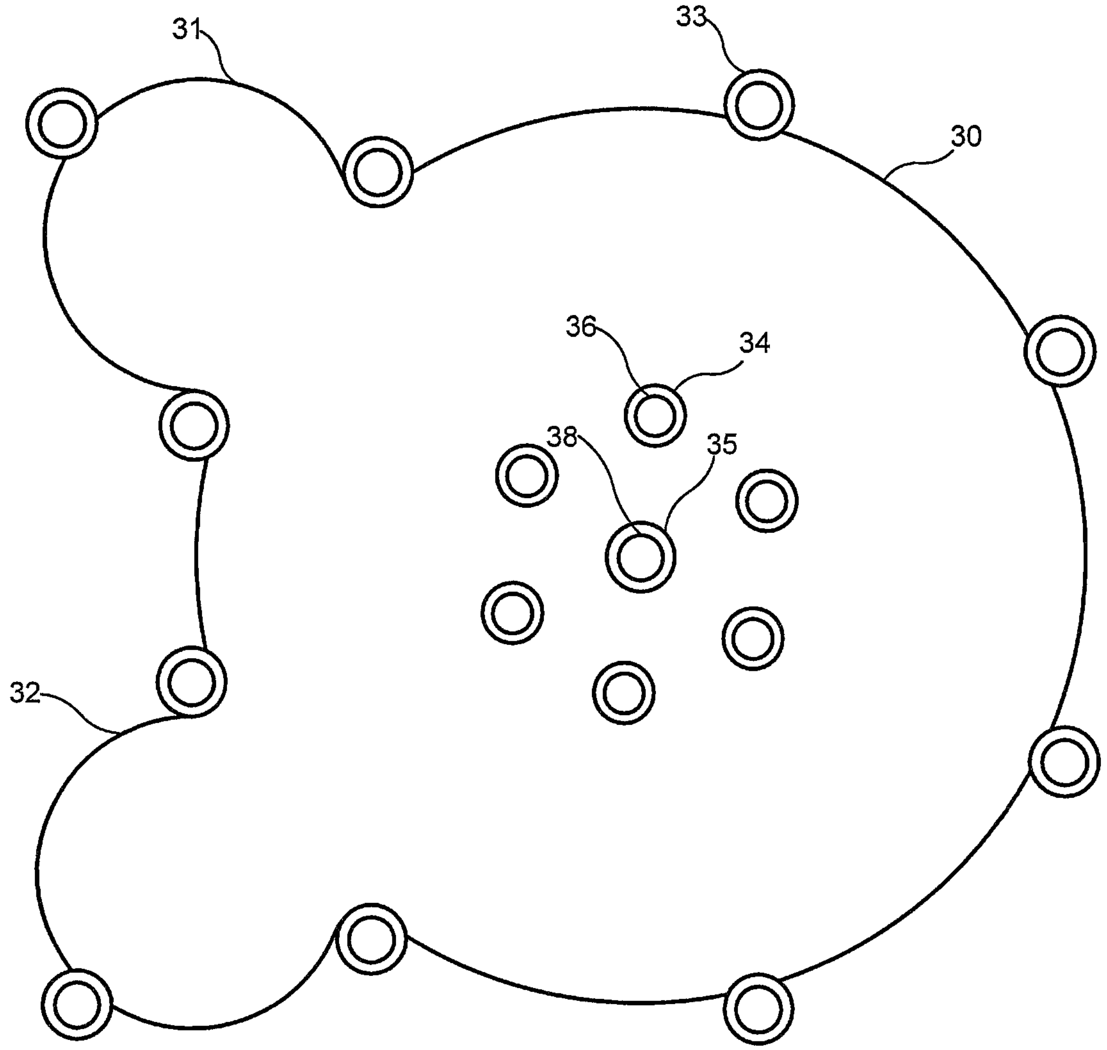

FIG. 9T illustrate top view of the cylinder covers where

31—covers the channel of the bypass valve 66A

32—round lid covers exhaust valve 64

33—opening for the bolts to attach the cover to the cylinder block

34—thread for screwing nozzles (for diesel type of fuel)

35—spark plug thread (for gas/petrol type of fuel)

36—opening for the fuel to be injected into the nozzle

37—opening for the spark plug if the fuel is used or modified with the tempered glass in diesel engine for observance of the combustion mechanism FIG. 9, illustrative bottom of the cylinder covers where:

38 gasket sealing between cover and cylinder block

Figure 8:
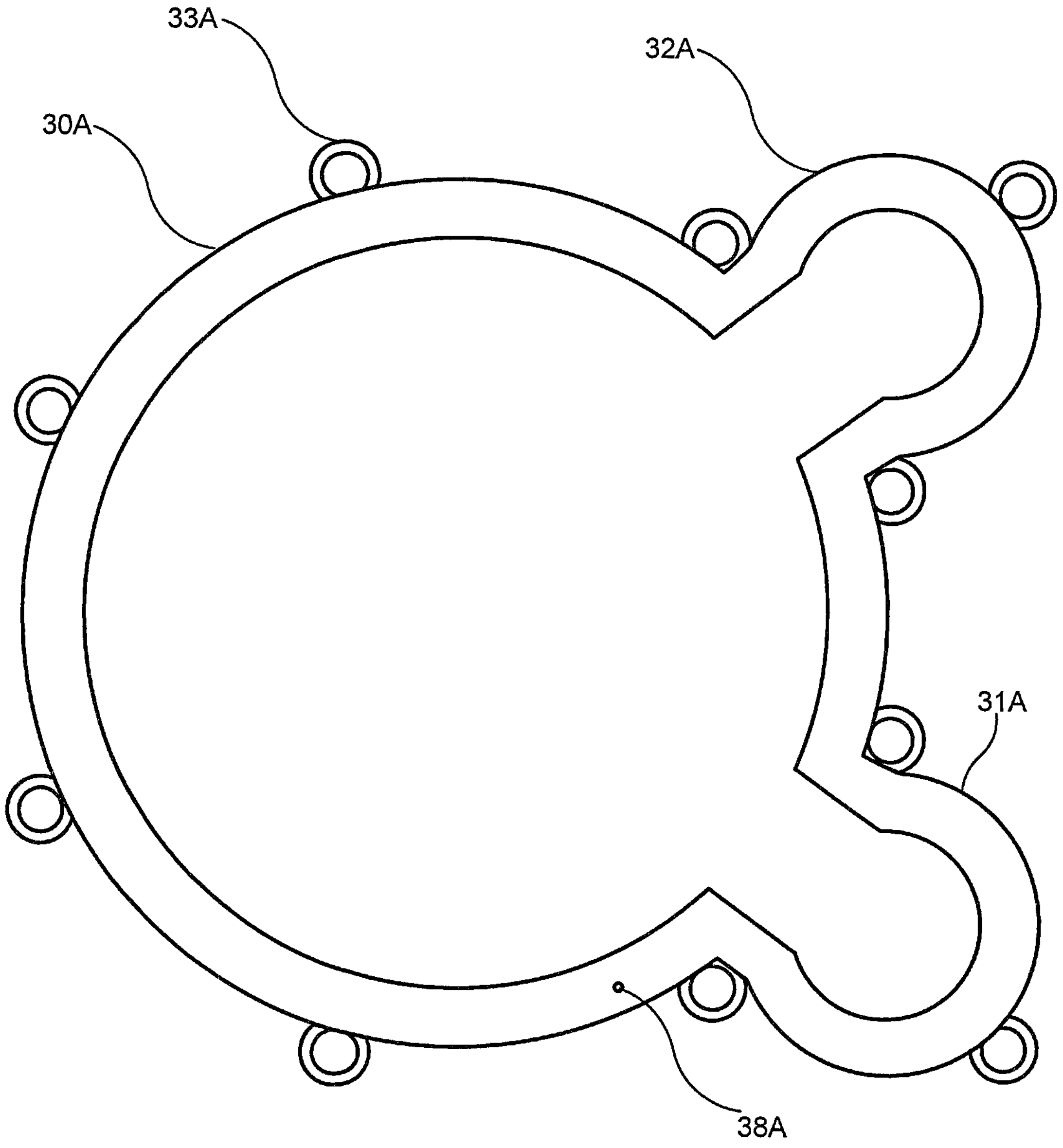
FIG. 8, 8T, 9, 9T illustrate top and bottom view of the cylinder covers.
Figure 8T:
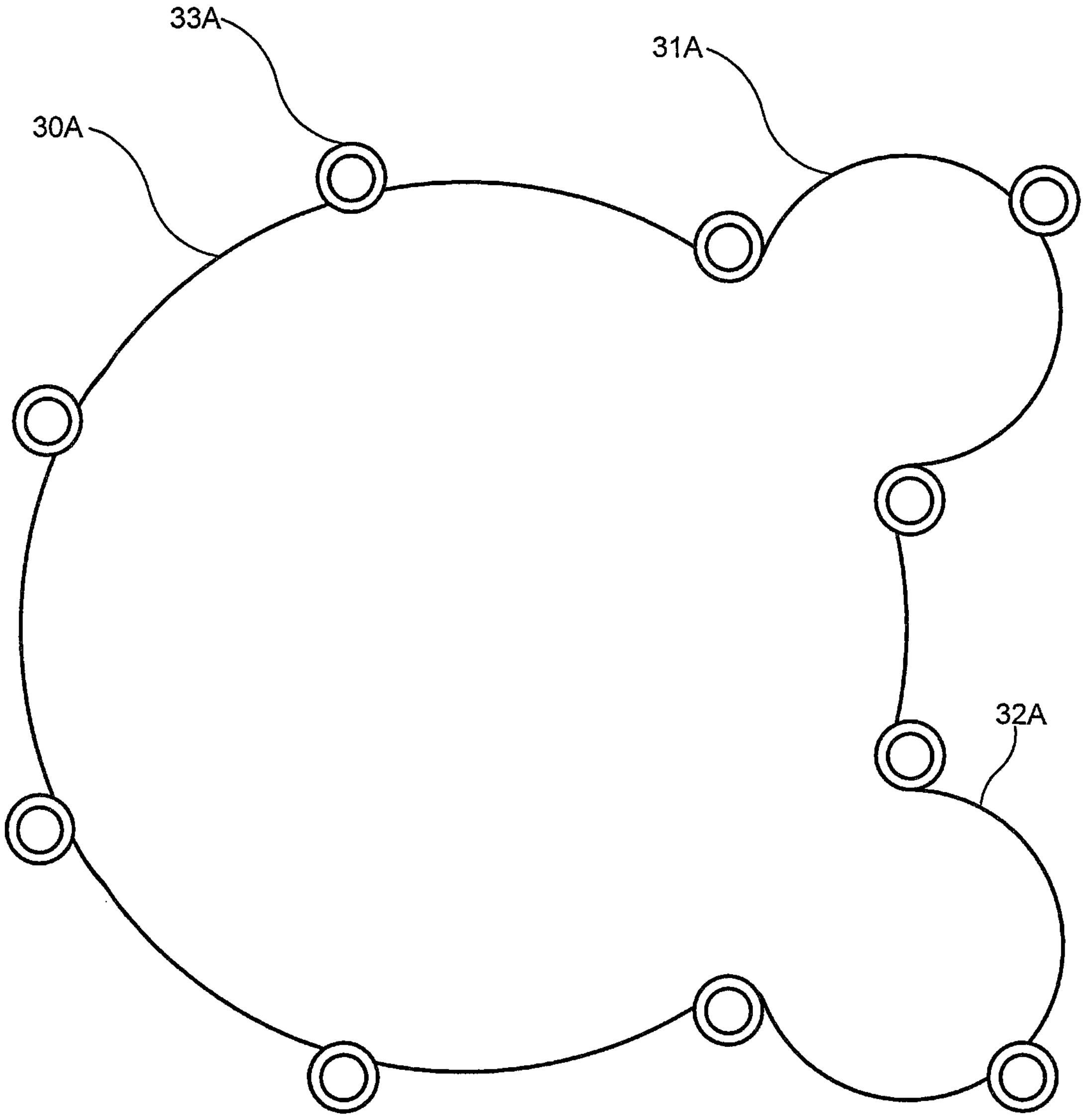

FIG. 8T, illustrates

30A—auxiliary cylinder cover (view from the top)

31A—curly ridge of the cylinder cover that is shielding the intake valve 62

32A—covers the channel of the bypass valve 66

33A—opening for the bolts to attach the cover to the cylinder block

FIG. 8 illustrates:

30A—auxiliary cylinder cover (view from the bottom)

38A—gasket/sealing between cover and cylinder block

Also, other previously described parts are also seen and reflected on this Figure.

Those skilled in the engineering will readily recognize, in accordance with the presentation of this invention, that the various features of the novel internal combustion engine illustrated by way of example in the foregoing may vary in alternative embodiments. For example, without limitation, the housings may have various different shapes or come in various different sizes.

Having fully described at least one embodiment of the present invention, other equivalent or alternative methods of providing a novel engine according to the present invention will be apparent to those skilled in the engineering. The invention has been described above by way of illustration, and the specific embodiments disclosed are not intended to limit the invention to the particular forms disclosed. For example, the particular implementation of the engine may vary depending upon the particular type of fuel used. Implementations of the present invention for use with different types of fuel are contemplated as within the scope of the present invention. The invention is thus to cover all modifications, equivalents, and alternatives falling within the spirit and scope of the following claims.

The above description of the disclosed preferred embodiments is provided to enable any person skilled in the art to make or use the invention. Various modifications to these embodiments will be readily apparent to those skilled in the art, and the principles described herein can be applied to other embodiments without departing from the spirit or scope of the invention and the subject matter of the present invention, which is broadly contemplated by the Applicant. The scope of the present invention fully encompasses other embodiments that may be or become obvious to those skilled in the art. It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood to refer to functional equivalents of such structures. Language that may be construed to express approximation should be so understood unless the context clearly dictates otherwise.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may be configured according to the needs of the particular application, whereby any aspect(s), feature (s), function(s), result(s), component(s), approach(s), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application It is to be understood that any exact measurements/dimensions or particular construction materials indicated herein are solely provided as examples of suitable configurations and are not intended to be limiting in any way. Depending on the needs of the particular application, those skilled in the art will readily recognize, in light of the following teachings, a multiplicity of suitable alternative implementation details.

A preferred embodiment of the present invention and some variations thereof provide an internal combustion engine, which may be used with conventional diesel or gasoline fuel. Alternative embodiments may be produced using different techniques and from different materials including, but not limited to, metals, composites, or a combination of materials. The preferred embodiments comprise a smaller number of parts than the conventional engines, which allows for quick and easy assembly, installation, repair and maintenance of the components and ensures minimum costs in the production of the device.

What is claimed is:

1. A fuel pump (100) for a working cylinder (22) of an internal combustion engine (10), said fuel pump comprising: a housing (112), said housing comprising: a fuel reservoir (116), said fuel reservoir configured to be filled from a car fuel tank; a first axle (160), said first axle configured to rotate with respect to said housing; wherein said first axle is configured to be rotated by actuation of a gas pedal cable (172); a second axle (160), said second axle configured to rotate with respect to said housing; a first gear (168), said first gear being fixedly secured to said first axle; a second gear (168), said second gear fixedly secured to said second axle and being configured to mesh with said first gear, wherein rotation of said first shaft axle (160) causes co-rotation of said second axle (160); a plurality of conduits, each comprising: a first conduit portion and a second conduit portion (130A), said first conduit portion configured to transition into said second conduit portion; wherein each said first conduit portion is in fluid communication with said fuel reservoir; wherein each said second conduit portion is in fluid communication with a fuel injector; a plurality of plungers (130), with one of said plurality of plungers being disposed in a respective plunger cylinder of each said second conduit portion (130A); a plurality of plunger springs (135), with each of said plurality of plunger springs being configured to bias a respective one of said plurality of plungers from a first plunger position into a second plunger position, said second plunger position configured to create a vacuum pressure in said second conduit portion; a rod (117) and a piston pin (115), said rod configured, when actuated by the crankshaft of the internal combustion engine, to simultaneously drive each pump plunger upwards to oppose said bias of each of said plurality of plunger springs (135) to position each of said plurality of plungers (130) in said first plunger position, and create fuel pressure to a pipe (206) being in fluid communication with the fuel injector; a first plurality of balls (142*i*, 142*ii*), with one of said first plurality of balls being disposed in each said first conduit portion; a plurality of ball-biasing springs (145), with one of said plurality of ball-biasing springs (145) disposed in each said first conduit portion, being configured to thereat bias said one of said first plurality of balls into a closed position to block fuel flow to the fuel injector, from an open position configured to permit fuel flow to the fuel injector; a second plurality of balls (142A, 142B), with one of said second plurality of balls being disposed in each said second conduit portion; a plurality of valve springs (145A), with one of said plurality of valve springs (145A) disposed in each said second conduit portion, being configured to thereat to bias said one of said second plurality of balls into a closed position to block fuel flow from the fuel reservoir, from an open position configured to permit fuel flow from the fuel reservoir; a plurality of pusher rods (162), with one of said plurality of pusher rods disposed in each said second conduit portion and positioned to contact said one of said second plurality of balls positioned in each said second conduit portion, on a side opposite of said one of said plurality of valve springs (145A); a first plurality of cams (164), each fixedly secured to said first axle (160), with each of said first plurality of cams (164) positioned to have a first contact region contact an exposed end of a respective one of said plurality of pusher rods at a first rotational position; a second plurality of cams (164), each fixedly secured to said second axle (160), with each of said second plurality of cams (164) positioned to have a first contact region contact an exposed end of a respective one of said plurality of pusher rods at a first rotational position; wherein said first gear, said second gear, said first plurality of cams, and said second plurality of cams are each positioned in said fuel reservoir; wherein upon rotation of said first axle (160) for increased crankshaft rotation speed of the internal combustion engine, said first plurality of cams concurrently rotates, and said first gear and said second gear cause said second axle to correspondingly rotate thereby causing said second plurality of cams to also concurrently rotate; and wherein for each increment of said rotation of said first axle into a second rotational position, a third rotational position, a fourth rotational position, and a fifth rotational position, a successive one of said first and second plurality of cams is sequentially rotated into a position configured to drive permit a respective said pusher rod to provide an incremental increase in fuel flow to the fuel injector.

2. The fuel pump (100) according to claim 1, wherein a first one of said first plurality of cams (164) in said first rotational position is configured to provide fuel flow for idling of the internal combustion engine.

3. The fuel pump (100) according to claim 2, wherein each other of said first plurality of cams after said first one and each of said second plurality of cams when successively rotated to said second rotational position, said third rotational position, said fourth rotational position, and said fifth rotational position provides an incremental increase in fuel flow to the fuel injector.

4. The fuel pump (100) according to claim 3, wherein each of said first plurality of cams and each of said second plurality of cams being at said fifth rotational position provides fuel flow for a maximum speed of the internal combustion engine.

5. The fuel pump (100) according to claim 4, wherein said first gear and said second gear are the same size.

6. The fuel pump (100) according to claim 5, wherein said plurality of conduits comprises: three of said first conduit portion and three of said second conduit portion (130A);

wherein said first plurality of balls comprises six balls (142*i*, 142*ii*, 142*iii*, 142*iv*, 142*v*, 142*vi*);

wherein said second plurality of balls comprises six balls (142A, 142B, 142C, 142D, 142E, 142F);

wherein said first plurality of cams comprises three cams; and wherein said second plurality of cams comprises three cams.

* * * * *